US010788847B2

(12) United States Patent
North et al.

(10) Patent No.: US 10,788,847 B2
(45) Date of Patent: Sep. 29, 2020

(54) APPARATUS AND METHODS FOR CHARACTERIZING A HEAT PIPE AND FOR CONTROLLING AN OPERATING PARAMETER OF AT LEAST ONE HEAT GENERATING COMPONENT COUPLED TO THE HEAT PIPE

(71) Applicant: DELL PRODUCTS L.P., Round Rock, TX (US)

(72) Inventors: Travis C. North, Cedar Park, TX (US); Andrew T. Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 508 days.

(21) Appl. No.: 15/585,509

(22) Filed: May 3, 2017

(65) Prior Publication Data
US 2018/0324979 A1 Nov. 8, 2018

(51) Int. Cl.
*G05D 23/19* (2006.01)
*G06F 1/20* (2006.01)

(52) U.S. Cl.
CPC ........... *G05D 23/1917* (2013.01); *G06F 1/20* (2013.01); *G06F 1/206* (2013.01); *F28F 2200/005* (2013.01)

(58) Field of Classification Search
CPC .............. F28F 2200/005; F28F 27/00; H05K 7/20381; H05K 7/20336; H05K 7/2039; G06F 1/206; G06F 1/20
See application file for complete search history.

(56) References Cited

U.S. PATENT DOCUMENTS 7,461,272 B2 12/2008 Rotem et al.
7,610,496 B2 10/2009 Kiim

OTHER PUBLICATIONS

Saengchandr et al., A Novel Approach for Cooling Electronics Using a Combined Heat Pipe and Thermoelectric Module, 2009, American J. of Engineering and Applied Sciences 2 (4), pp. 603-610 (Year: 2009).*
Li et al., Studies on Heat Transfer Performances of a Heat Pipe Radiator Used in Desktop PC for CPU Cooling, 2011 IEEE, pp. 2022-2026 (Year: 2011).*
Tsai et al., "Dynamic Test Method For Determining The Thermal Performances of Heat Pipes International Journal of Heat and Mass Transfer", No. 53, 2010, 12 pgs.

(Continued)

*Primary Examiner* — Toan M Le
(74) *Attorney, Agent, or Firm* — Egan Peterman Enders Huston (57) ABSTRACT

Embodiments of apparatuses and methods are provided herein for characterizing a heat pipe, and for controlling an operating parameter of at least one heat generating component thermally coupled to the heat pipe based on a temperature difference measured across a first section and a second section of the heat pipe. For example, a characterization method is provided for determining at least one threshold value, which can be used to predict heat pipe dry-out within the heat pipe, and a thermal time constant (time lag) between the onset of heat pipe dry-out and a heat pipe dry-out limit. During subsequent system operation, the predetermined threshold value and thermal time constant may be used to extend the performance of the heat pipe to the edge of its cooling capacity.

18 Claims, 5 Drawing Sheets

(56) References Cited

OTHER PUBLICATIONS

Faghri, "Heat Pipes: Review, Opportunities and Challenges", Frontiers in Heat Pipes, No. 5, 2014, 48 pgs.
Kidd, Power Management States: P-States, and Package C-States, Intel, 2014, 7 pgs.
Wang et al., "Thermal Characterisation Analysis of Heat Sink Heat Pipes Under Forced Convection", Int. J. Mech, Eng. Autom., vol. 2, No. 1, 2015, 8 pgs;.
Nemee et al., "Thermal Performance Measurement of Heat Pipe", Transaction on Thermodynamic and Heat Transfer, Jun. 2011, 7 pgs.
Liu et al., "Dynamic Thermal Characteristics of Heat Pipe Via Segmented Thermal Resistance Model for Electric Vehicle Battery Cooling", Journal of Power Sources, 321, 2016, 14 pgs.

\* cited by examiner

APPARATUS AND METHODS FOR CHARACTERIZING A HEAT PIPE AND FOR CONTROLLING AN OPERATING PARAMETER OF AT LEAST ONE HEAT GENERATING COMPONENT COUPLED TO THE HEAT PIPE

FIELD OF THE INVENTION

This invention relates generally to information handling systems, and more particularly to controlling an operating parameter of at least one heat generating component of the information handling system based on heat pipe temperature.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems employ central processing units (CPUs) to perform processing tasks for the system. Some CPUs are configured to operate in a "Turbo Boost" mode during which the CPU is enabled to run at a higher clock rate than its base operating frequency (referred to as dynamic CPU overclocking) during periods of high processing demand as requested by the operating system (OS) of the information handling system. CPU processor performance states are typically defined for a CPU by the Advanced Configuration and Power Interface (ACPI) specification, and the OS typically requests the highest CPU performance state for the maximum Turbo Boost mode, which is typically limited only by electrical (power, current) and thermal limits of the CPU. Thus, Turbo Boost mode may be allowed upon OS request as long as the CPU remains within its defined electrical and thermal limits, and/or based on other parameters. For example, the OS may request maximum processor frequency (ACPI P0) and the power management unit (PMU) of the CPU may allow or deny the request based upon number of active processor cores, estimated current, estimated power and processor temperature, and may decide if and how much turbo will be applied.

A Turbo Boost implementation enables burst type operations, which are typical of client workloads. When workloads are bursty, the processor performance appears to be that of a processor operating at a much higher frequency. During Turbo Boost, however, the CPU is allowed to draw significantly more power than the Thermal Design Power (TDP) specified for the CPU for short periods of time. TDP is a power level (expressed in watts, W) that represents the maximum amount of heat generated by a component that the system is configured to dissipate in typical operation. In one example, a CPU having a TDP of 15 W during typical operation may draw approximately 45 W or more of dynamic power when operating in Turbo Boost mode. This places a significant amount of strain on the heat dissipating components of the system.

SUMMARY OF THE INVENTION

The following description of various embodiments of apparatuses, information handling systems and related methods is not to be construed in any way as limiting the subject matter of the appended claims.

Generally speaking, the present disclosure provides an improved thermal power management solution (e.g., an apparatus and related methods) that may be used to extend the performance of a heat pipe to the edge of its cooling capacity, so that a heat pipe with a deficient maximum heat transportation limitation (e.g., a $Q_{max}$ of about 22 W) can meet the cooling requirements of a multi-power mode processing device (e.g., a CPU or GPU) even when such a device operates in a higher power operating mode (e.g., at a second power level, PL2, of about 45 W or more). Prior to system operation, a characterization method may be conducted to determine threshold value(s), which can be used to predict heat pipe dry-out within a heat pipe having one or more heat generating devices thermally coupled thereto. In some embodiments, the characterization method may also determine the thermal time constant (time lag) between the onset of heat pipe dry-out and a heat pipe dry-out limit. During operation of an information handling device containing the heat generating devices, the predetermined threshold value(s) and the thermal time constant may be used in the thermal power management solution to extend the performance of the heat pipe to the edge of its cooling capacity.

According to one embodiment, a method is provided herein for characterizing a heat pipe thermally coupled to a heat generating component of an information handling system. In general, the characterization method may include obtaining temperature measurements from the heat pipe while supplying power to the heat generating component at a first power level for a first time period, and immediately thereafter increasing the supplied power to a second power level. From the temperature measurements, the characterization may detect an onset of heat pipe dry-out and a heat pipe dry-out limit. The characterization may also determine, from the temperature measurements, a temperature difference between a first temperature measured from the heat pipe at the onset of heat pipe dry-out and a second temperature measured from the heat pipe at the heat pipe dry-out limit. In some embodiments, a time duration between the onset of heat pipe dry-out and the heat pipe dry-out limit may also be determined from the temperature measurements. The temperature difference and/or the time duration may then be stored for later use.

In some embodiments, the onset of heat pipe dry-out may be detected by detecting the (first) temperature at which the temperature measurements obtained from the heat pipe transition from a steady state temperature to increasing at a substantially fixed rate. In some embodiments, the heat pipe dry-out limit may be detected by detecting the (second)

temperature at which the temperature measurements obtained from the heat pipe transition from increasing at the substantially fixed rate to increasing at a significantly greater rate than the substantially fixed rate.

In some embodiments, the characterization method may be used to characterize a heat pipe when only one heat generating component is thermally coupled to the heat pipe. In one example, the temperature measurements may be obtained from a first temperature sensor coupled to the heat pipe in the vicinity of the first heat generating component for measuring temperatures associated with the first heat generating component, and a second temperature sensor coupled to a condenser section of the heat pipe.

If a second heat generating component is thermally coupled to the heat pipe, the characterization method may obtain additional temperature measurements from the second temperature sensor and a third temperature sensor, which is coupled to the heat pipe in the vicinity of the second heat generating component. The additional temperature measurements may be obtained while supplying power to the second heat generating component at the first power level for the first time period, and immediately thereafter increasing the supplied power to the second power level. In addition, the characterization method may include detecting an onset of heat pipe dry-out and a heat pipe dry-out limit from the additional temperature measurements, and determining a second temperature difference between a third temperature measured from the heat pipe at the onset of heat pipe dry-out and a fourth temperature measured from the heat pipe at the heat pipe dry-out limit. In some embodiments, the characterization method may also determine a second time duration between the onset heat pipe dry-out and the heat pipe dry-out limit. Moreover, the characterization method may store the second temperature difference and/or the second time duration for later use.

According to additional embodiments, an apparatus and method are provided herein for controlling an operating parameter of a heat generating component of an information handling system. The heat generating component may be any electronic component of the information handling system (such as, e.g., a processing device or a controller) that generates heat. To dissipate such heat, the heat generating component may be thermally coupled to a heat pipe, for example. In some embodiments, the heat generating device may comprise a first power level limit and a second power level limit, which is greater than the first power level limit. When operating at the second power level limit, the heat generating device may generate significantly more heat.

According to one embodiment, the apparatus may include a first temperature sensor coupled to a first section of the heat pipe, a second temperature sensor coupled to a second section of the heat pipe, and a controller coupled to the first temperature sensor, the second temperature sensor and the heat generating component. The controller may be configured to determine a temperature difference across the first and second sections of the heat pipe, determine an amount of power supplied to the heat generating component, and decrease a value of the operating parameter by a fixed amount, if the amount of power is greater than a maximum heat transportation limitation of the heat pipe and the temperature difference is greater than a first threshold value indicative of heat pipe dry-out. Although not strictly limited to such, the operating parameter may be at least one of a voltage, a current, a power, a frequency, a duty cycle, and a duration of time.

In some embodiments, the controller may be configured to repeat the steps of determining a temperature difference, determining an amount of power supplied to the heat generating component, and decreasing a value of the operating parameter by a fixed amount until the amount of power is less than or equal to the maximum heat transportation limitation of the heat pipe and/or the temperature difference is less than or equal to the first threshold value.

In some embodiments, the controller may be configured to control an operating parameter of only one heat generating component thermally coupled to the heat pipe. In some embodiments, the controller may be configured to control operating parameter(s) of a plurality of heat generating components thermally coupled to the heat pipe. If, for example, a second heat generating component is thermally coupled to the heat pipe, the controller may determine a second temperature difference across a third section of the heat pipe and the second section of the heat pipe. Next, the controller may determine an amount of power supplied to the second heat generating component, so that a combined amount of power supplied to the heat generating component and to the second heat generating component can be determined. In some embodiments, the controller may reduce the amount of power supplied to the heat generating component by the fixed amount, if the combined amount of power is greater than the maximum heat transportation limitation of the heat pipe and the temperature difference exceeds the first threshold value indicative of heat pipe dry-out. On the other hand, the controller may reduce the amount of power supplied to the second heat generating component by the fixed amount, if the combined amount of power is greater than the maximum heat transportation limitation of the heat pipe and the second temperature difference exceeds the first threshold value indicative of heat pipe dry-out.

In some embodiments, the controller may be configured to set the information handling system in a reduced performance mode, if the amount of power supplied to the heat generating component is less than or equal to the maximum heat transportation limitation of the heat pipe, but the temperature difference exceeds a second threshold value, which is less than the first threshold value. In one example, the controller may set the information handling system in the reduced performance mode by reducing the first power level limit and the second power level limit each by a predetermined amount.

BRIEF DESCRIPTION OF THE DRAWINGS

Other advantages of the invention will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 1:
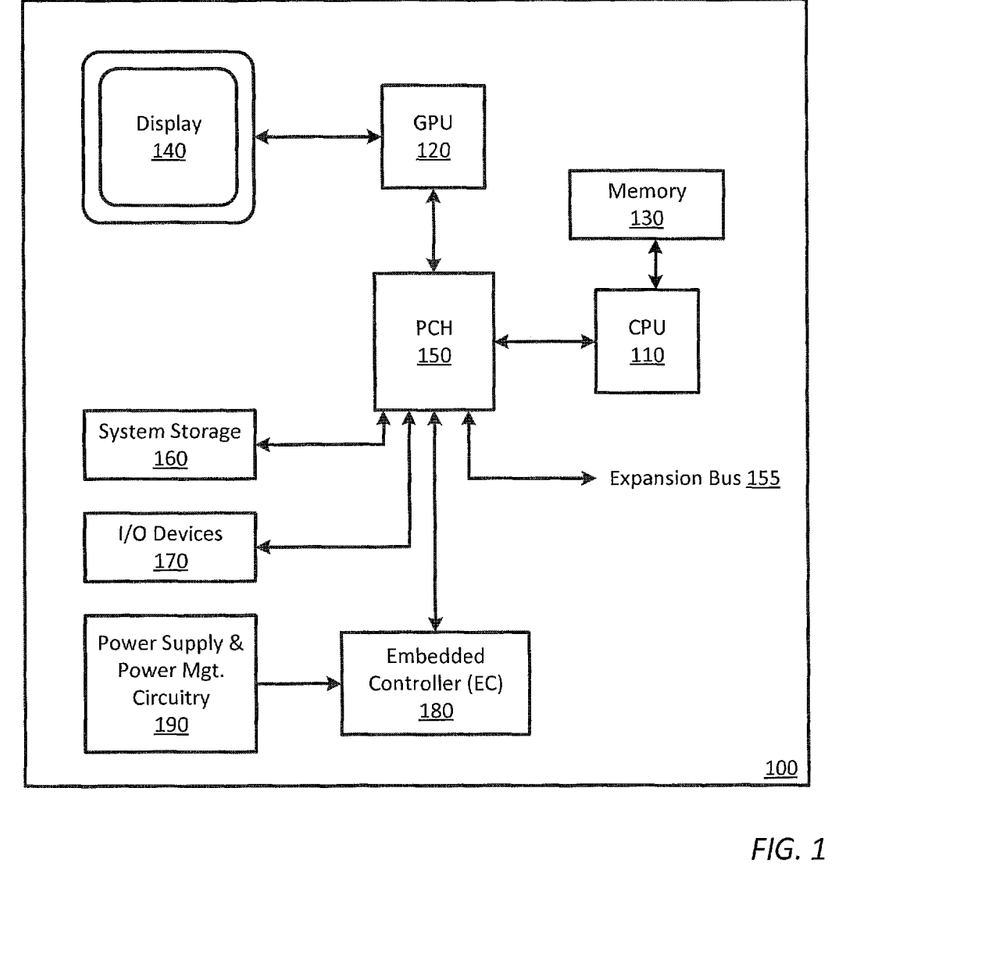
FIG. 1 is a block diagram illustrating an information handling system according to one exemplary embodiment of the present disclosure.

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it will be understood that the configuration of FIG. 1 is exemplary only, and that the disclosed apparatuses and methods may be implemented on any other type of information handling system.

As shown in FIG. 1, information handling system 100 may include at least one processing device having multiple power modes, otherwise referred to as a "multi-power mode processing device." A multi-power mode processing device is one, which may be configured with multiple power modes that vary over time, with each power mode having a different required power level corresponding to a different real time processing requirement. In one embodiment, a multi-power mode processing device may operate at a first power level (PL1) during a normal or default mode of operation, and may operate at a second power level (PL2), which is substantially greater than the first power level, during a Turbo Boost mode of operation.

In the exemplary information handling system of FIG. 1, central processing unit (CPU) 110 is a multi-power mode processing device that executes an operating system (OS) for system 100. CPU 110 may generally include any type of multi-mode processing device, such as an Intel Pentium series processor, an Advanced Micro Devices (AMD) processor or another multi-power mode processing device. In some embodiments, CPU 110 may include multiple processing cores, where each processing core is capable of operating at multiple power levels. In some embodiments, information handling system 100 may include other types of multi-power mode processing devices including, but not limited to, graphics processor unit (GPU) 120, a graphics-derivative processor (such as a physics/gaming processor), a digital signal processor (DSP), etc.

In one example, a multi-power mode processing device (such as, e.g., CPU 110 and/or GPU 120) may include at least two power modes. A first (e.g., normal or default) power mode may have a clock rate equal to a base operating frequency of the processing device, and/or may have a first power level (PL1) that does not exceed the thermal design power (TDP) of the multi-power mode processing device. A second (e.g., a "Turbo Boost") power mode may be a temporary (e.g., pulsed) power mode, during which the multi-power mode processing device is enabled to run at a substantially higher clock rate than its base operating frequency (dynamic processor overclocking), and/or at a second power level (PL2) that is higher than the first power level (PL1) and exceeds the TDP of the multi-power mode processing device. This temporary, significantly higher second power mode may be initiated, for example, during periods of high processing demand, as may be requested by the OS of the information handling system 100 and approved or otherwise allowed by a power management unit (PMU) of the CPU 110. In some instances, the second power mode may be terminated when the multi-power mode processing device reaches its maximum allowable operating temperature (i.e., no thermal headroom is left).

Still referring to the exemplary embodiment of FIG. 1, CPU 110 is coupled to system memory 130 via data channel 135. System memory 130 may include, for example, random access memory (RAM), read only memory (ROM), dynamic RAM (DRAM), synchronous DRAM (SDRAM), and other suitable storage mediums. Display device 140 (e.g., LCD display or other suitable display device) is coupled to graphics processing unit (GPU) 120 to provide visual images (e.g., a graphical user interface, static images and/or video content) to the user. GPU 120 is, in turn, coupled to CPU 110 via platform controller hub (PCH) 150, which facilitates input/output functions for information handling system 100. Local system storage 160 (e.g., one or more media drives, such as hard disk drives, optical drives, NVRAM, Flash or any other suitable form of internal or external storage) is coupled to PCH 150 to provide permanent storage for the information handling system 100. Input/output devices 170 (e.g., a keyboard, mouse, touchpad, touchscreen, etc.) are coupled to PCH 150 to enable the user to interact with information handling system 100, and to interact with application programs or other software/firmware executing thereon. In some embodiments, expansion bus 155 may be coupled to PCH 150 to provide the information handling system 100 with additional plug-in functionality. Expansion bus 155 may be, for example, a PCI bus, PCI Express bus, SATA bus, USB or any other suitable expansion bus.

Embedded controller (EC) 180 is coupled to PCH 110 and configured to run the system BIOS and perform other functions. EC 180 may be coupled, in one embodiment, to power supply and/or power management circuitry 190 for receiving the power needed to operate information handling system 100. In some embodiments, power supply and/or power management circuitry 190 may be coupled to an external source of alternating current (AC) power (e.g., AC mains), and may be configured for converting the received AC power into direct current (DC) power, which is used to operate system 100. In other embodiments, power supply and/or power management circuitry 190 may be coupled to an external source of DC power, such as provided by an AC adapter coupled to the AC mains. In yet other embodiments, information handling system 100 may include an internal DC power source (e.g., a battery) that may be used to provide system power for information handling system 100, e.g., when an external source of power is not available or not desirable.

According to one embodiment, EC 180 may comprise and/or may be configured to execute program instructions to control one or more operating parameters of a multi-power mode processing device (e.g., CPU 110 and/or GPU 120) based on temperature. In particular, EC 180 may comprise and/or may be configured to execute program instructions to control one or more operating parameters of a multi-power mode processing device based on a temperature difference measured across multiple sections (e.g., a first section and a second section) of a heat pipe, as described in more detail below.

During operation of information handling system 100, heat generated by heat generating components of the system, such as CPU 110, GPU 120 and/or PCH 150, may cause the heat generating components to over-heat. In order to dissipate heat from the components, one or more of the heat generating components of the system (e.g., CPU 110, GPU 120 and/or PCH 150) may be thermally coupled to a passive or active heat sink, heat exchanger, heat spreader and/or cooling unit. A passive heat sink generally includes fins or other protrusions for dissipating heat, while an active heat sink comprises or is coupled to a cooling unit, such as a fan, to provide convective cooling to the heat sink. In some systems, the heat generating components of the system may be thermally coupled to one or more heat pipes for conducting heat generated by the components to a heat sink, as shown in the exemplary embodiment of FIG. 2.

As known in the art, a heat pipe is a closed evaporator-condenser system generally comprising a sealed, hollow tube, which is partially filled with a working fluid. In some heat pipes, the inside walls of the heat pipe may be lined with a capillary structure or wick. When heat is absorbed at the hot interface (i.e., the evaporator section) of the heat pipe, a portion of the working fluid vaporizes into a gas, which travels through the adiabatic section of the heat pipe to the cold interface (i.e., the condenser section) of the heat pipe, where it condenses back into a liquid—releasing the latent heat. The condensed liquid then returns to the hot interface of the heat pipe, e.g., via capillary action through the wick, and the cycle repeats. Due to high heat transfer coefficients for evaporation and condensation, heat pipes are highly effective thermal conductors.

When too much heat is applied to the evaporator section of a heat pipe, the working fluid within the heat pipe stops absorbing heat and heat pipe dry-out occurs. To avoid heat pipe dry-out, heat pipes are generally specified as having a maximum heat transportation limitation, $Q_{max}$, at the designated dry-out point. The $Q_{max}$ of a heat pipe (expressed in watts, W) is a function of the capillary limit, which is dependent on many factors including, but not limited to, heat pipe geometry (e.g., length, diameter, cross-sectional shape, etc.), type of working fluid, etc.

In many information handling systems, a particular heat pipe configuration may be chosen to ensure that the maximum heat transportation limitation, $Q_{max}$, of the heat pipe is slightly greater than or equal to the Thermal Design Power (TDP) specified for the heat generating components thermally coupled to the heat pipe during normal or default modes of operation. However, during some operating modes (e.g., during Turbo Boost mode), the dynamic power draw of a multi-power mode processing device may be three times TDP or more, which places significant strain on heat transport capabilities of the heat pipe. This strain is further exasperated when the heat pipe thickness is reduced (i.e., the heat pipe is flattened) to accommodate increasingly thinner information handling systems, since decreasing the heat pipe thickness reduces $Q_{max}$.

Figure 2:
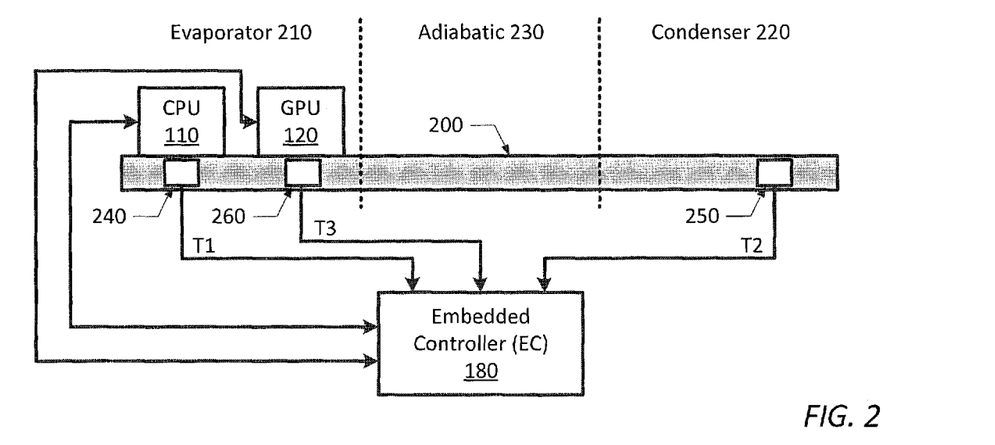
FIG. 2 is a simplified block diagram illustrating one or more heat generating components of an information handling system thermally coupled to a heat pipe, and an apparatus that may be used to control one or more operating parameters of the heat generating component(s) based on a temperature difference measured across the heat pipe.

FIG. 2 is a simplified block diagram illustrating a thermal power management solution, according to one exemplary embodiment of the present disclosure. More specifically, FIG. 2 is a simplified block diagram illustrating one or more heat generating components thermally coupled to a heat pipe. In the example embodiment of FIG. 2, CPU 110 and GPU 120 are thermally coupled to heat pipe 200. As used herein, "thermally coupled" means that heat is transferred from the heat generating component(s) to the heat pipe through a direct connection (such as when the heat generating components are in physical contact with the heat pipe) or an indirect connection (e.g., via conduction, convection or radiation of thermal energy).

Although CPU 110 and GPU 120 are thermally coupled to heat pipe 200 in the example embodiment of FIG. 2, it should be understood that additional and/or alternative heat generating components may be coupled to the heat pipe without departing from the scope of the present disclosure. Although two heat generating components are specifically shown in FIG. 2, the thermal power management solution described herein is not restricted to such, and may generally function as described when one or more heat generating components are thermally coupled to the heat pipe. It is further noted that, although heat pipe 200 is illustrated in FIG. 2 as a substantially straight length of pipe, heat pipe 200 is not restricted to such a configuration, and may comprise any geometry and/or configuration needed to meet the needs of a particular information handling system.

As shown in FIG. 2, heat pipe 200 may generally include an evaporator section (i.e., a first section) 210, a condenser section (i.e., a second section) 220 and an adiabatic section (i.e., a third section) 230. The heat generating components (e.g., CPU 110 and GPU 120) are thermally coupled to the evaporator section 210 of the heat pipe. As noted above, heat absorbed by the evaporator section 210 may vaporize a portion of the working fluid into a gas, which travels through the adiabatic section 230 to the condenser section 220, where the gas condenses back into a liquid to release the latent heat. In conventional information handling systems, the heat pipe was designed so that the maximum heat transportation limitation, $Q_{max}$, of the heat pipe is greater than or equal to the Thermal Design Power (TDP), which is specified for the heat generating components during typical operation. For example, an 8 mm round heat pipe having a length of 200 mm may be used in a conventional information handling system to provide approximately 75 W cooling capacity, thereby meeting or exceeding the TDP specified for the system during normal or default (e.g., PL1) modes of operation.

As the quest continues for increasingly thinner information handling systems, a need has arisen to decrease the thickness (t) of the heat pipe to reduce the overall Z dimension of the information handling system platform. However, reducing the heat pipe thickness decreases the maximum heat transportation limitation, $Q_{max}$, of the heat pipe, thereby limiting the amount of heat the heat pipe can effectively dissipate. For example, if the 200 mm heat pipe described above were flattened to 1 mm, the $Q_{max}$ of the heat pipe would be reduced from 75 W to 18 W cooling capacity.

Figure 3:
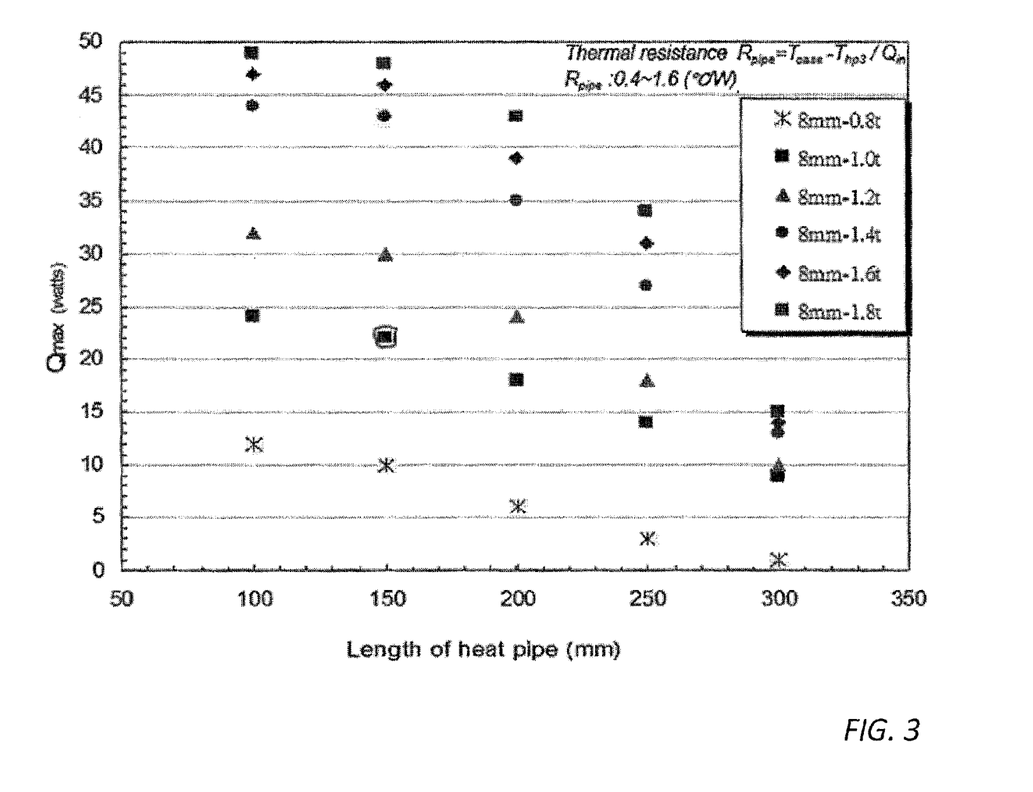
FIG. 3 is a graph illustrating the maximum heat transportation limitation, $Q_{max}$, attainable by various exemplary heat pipe configurations having different lengths and thicknesses.

FIG. 3 is a graph illustrating the $Q_{max}$ attainable by various exemplary heat pipe configurations having different lengths (specified in mm) and thicknesses (specified in mm). To obtain the data shown in FIG. 3, a plurality of 8 mm round heat pipes having a range of lengths (e.g., 100 mm, 150 mm, 200 mm, 250 mm and 300 mm) were flattened to a range of thicknesses (e.g., 0.8 mm, 1.0 mm, 1.2 mm, 1.4 mm, 1.6 mm and 1.8 mm) and the $Q_{max}$ attainable by such heat pipes was measured. As shown in FIG. 3, $Q_{max}$ generally decreases with increasing heat pipe length and decreasing heat pipe thickness.

As noted above, some multi-power mode processing devices may draw more than three times the specified TDP during Turbo Boost modes. In one example, a CPU with a TDP of 15 W (PL1) during typical operation may temporarily draw up to about 45 W (PL2) or more for short periods of time when operating in Turbo Boost mode. As shown in FIG. 3, such cooling requirements may be met by an 8 mm round heat pipe having a length ranging between about 100-150 mm and a thickness ranging between about 1.4-1.8 mm. However, the overall Z dimension of the information handling system platform may require a substantially thinner heat pipe to be used. For example, it may be desirable to use an 8 mm round heat pipe having a length of about 150 mm and a thickness of only 1.0 mm to meet the Z platform requirements specified for the information handling system. Such a heat pipe provides a $Q_{max}$ of only 22 W and cannot meet the cooling capacity requirements (e.g., 45 W or more) of the exemplary CPU operating in Turbo Boost mode.

FIG. 2 provides a thermal power management solution, which enables a heat pipe configuration with a deficient $Q_{max}$ (e.g., about 22 W) to meet the cooling requirements of a multi-power mode processing device (e.g., CPU 110 and/or GPU 120) even when such a device operates in a Turbo Boost operating mode (e.g., at a second power level, PL2, of about 45 W or more). Although useful in controlling operating parameter(s) of a multi-power mode processing device, the thermal management solution shown in FIG. 2 and described herein is not limited to multi-power mode processing devices, and may be used to control operating parameter(s) of processing devices having only one power mode and/or operating parameter(s) of other heat generating components of the system. As such, the thermal power management solution presented herein is described below in the generic context of a "heat generating component."

The thermal power management solution shown in FIG. 2 may be generally described as an apparatus comprising a plurality of temperature sensors and a controller, which is coupled and configured for controlling one or more operating parameter(s) of one or more heat generating components based on temperature measurements received from the plurality of temperature sensors. According to one embodiment, the controller may be the embedded controller (EC) 180 shown, for example, in the information handling system 100 of FIG. 1. However, the controller is not limited to EC 180 and may be alternatively implemented within a CPU, a PMU or virtually within an OS driver.

As shown in FIG. 2, a first temperature sensor 240 is coupled to the evaporator section 210 (e.g., a first section) of heat pipe 200 in the vicinity of a first heat generating component (e.g., CPU 110) for measuring a first temperature (T1) associated with the first heat generating component. A second temperature sensor 250 is coupled to the condenser section 220 (e.g., a second section) of heat pipe 200 for measuring a second temperature (T2) corresponding to the condenser section. In some embodiments, additional temperature sensors may be coupled to the evaporator section of the heat pipe for measuring temperatures associated with additional heat generating components coupled thereto. For example, a second heat generating device (e.g., GPU 120) may be thermally coupled to the heat pipe, as shown in FIG. 2. If a second heat generating device is included, a third temperature sensor 260 may be coupled to the evaporator section 210 of the heat pipe in the vicinity of the second heat generating component for measuring a third temperature (T3) associated with the second heat generating component. Substantially any suitable type of temperature sensor may be used including, but not limited to, thermistors, diodes, and thermocouples to name a few.

As shown in FIG. 2, EC 180 maybe coupled for receiving the temperature measurements (e.g., T1, T2 and T3) from the temperature sensors 240, 250 and 260, and may be configured for determining at least one temperature difference (e.g., T1–T2 and/or T3–T2) across the evaporator 210 and condenser 220 sections of the heat pipe 200. As described in more detail below, EC 180 may monitor the temperature difference(s) measured across heat pipe 200 to detect the onset of heat pipe dry-out, and if a heat pipe dry-out limit is detected, EC 180 may alter one or more operating parameters of one or more heat generating components coupled to the heat pipe. As described in more detail below, the onset of heat pipe dry-out and the heat pipe dry-out limit may be detected in some embodiments by comparing the monitored temperature difference(s) to one or more threshold values indicative of heat pipe dry-out. The threshold value(s) may be determined through characterization for a particular heat pipe configuration, and in some cases, individual threshold values may be determined for each heat generating component thermally coupled to the heat pipe.

Figure 4:
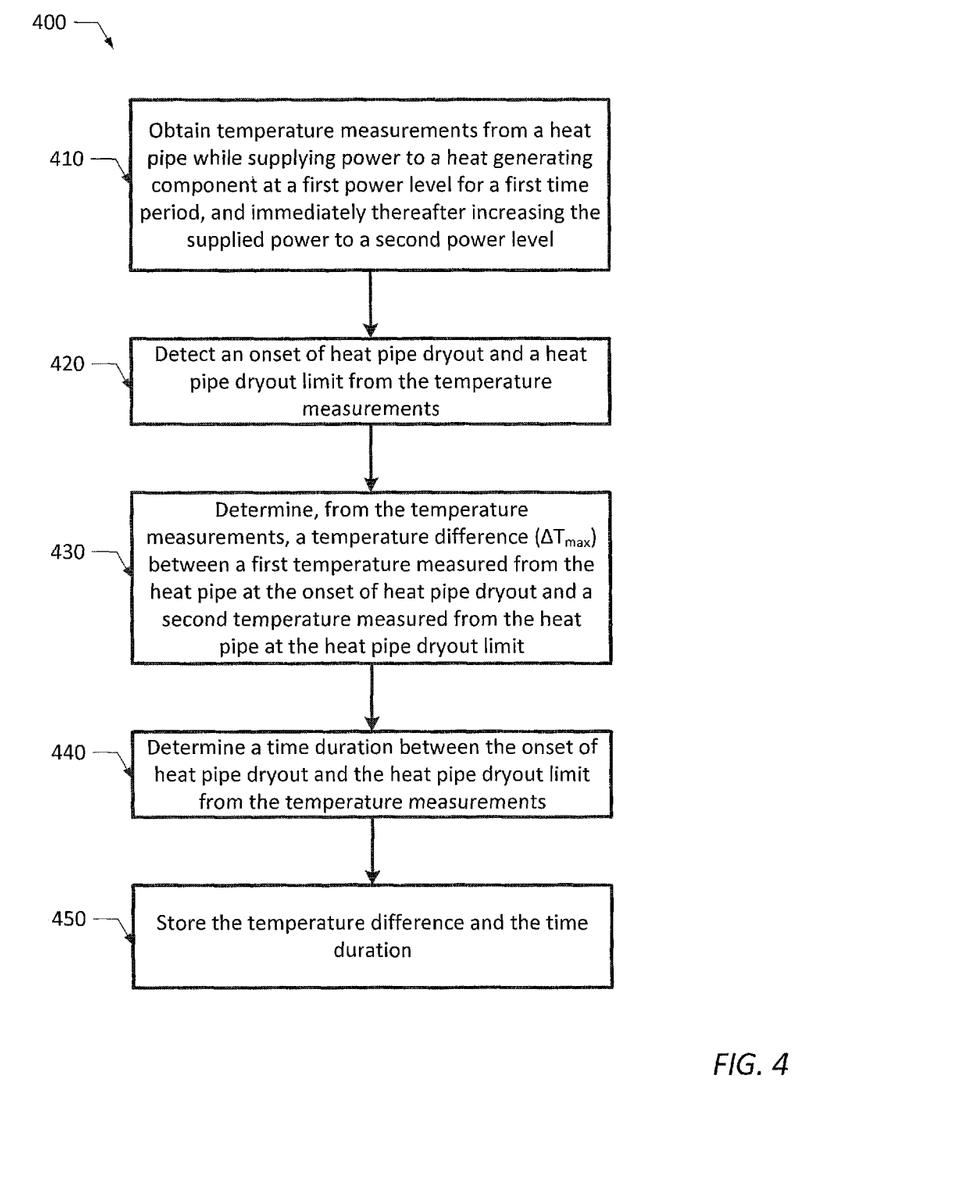
FIG. 4 is a flowchart diagram illustrating one embodiment of a method that may be used for characterizing a heat pipe thermally coupled to one or more heat generating components of an information handling system.

FIG. 4 is a flowchart diagram illustrating one embodiment of a method 400 that may be used for characterizing a heat pipe thermally coupled to one or more heat generating components of an information handling system. According to one embodiment, the characterization method 400 shown in FIG. 4 may be performed by a manufacturer of the heat pipe, or a manufacturer of the information handling system in which the heat pipe is used to dissipate heat from heat generating component(s). As described in more detail below, characterization method 400 may be performed to determine threshold value(s), which can be later used by EC 180 (or another "controller") to detect or predict heat pipe dry-out within a heat pipe having one or more heat generating devices thermally coupled thereto. In addition, characterization method 400 can be used to measure the thermal time constant (time lag) between the onset of heat pipe dry-out and a heat pipe dry-out limit. During operation of the information handling device, EC 180 (or another "controller") may use the predetermined threshold value(s) and the thermal time constant to extend the performance of the heat pipe to the edge of its cooling capacity.

According to one embodiment, method 400 may begin in step 410 by obtaining temperature measurements from the heat pipe while supplying power to a heat generating device at a first power level (e.g., a first power level, PL1, of about 15 W) for a first time period, and immediately thereafter increasing the supplied power to a second power level (e.g., a second power level, PL2, of about 45 W). From the temperature measurements obtained in step 410, method 400 may detect an onset of heat pipe dry-out and a heat pipe dry-out limit in step 420, and may determine a temperature difference in step 430 between a first temperature ($T_{onset}$) measured from the heat pipe at the onset of heat pipe dry-out and a second temperature ($Td_{dry-out}$) measured from the heat pipe at the heat pipe dry-out limit.

Figure 5:
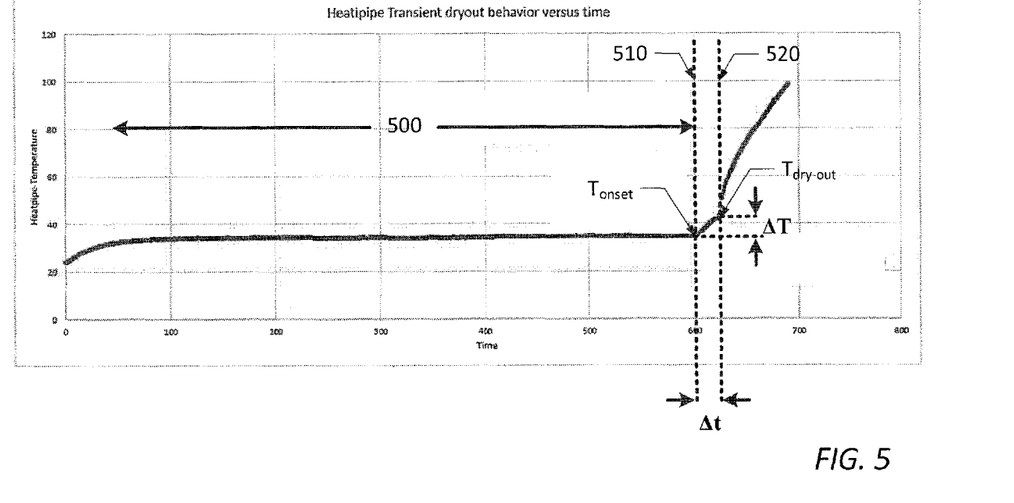
FIG. 5 is a graph illustrating the thermal response of an exemplary heat pipe over time.

FIG. 5 is a graph illustrating the thermal response of an exemplary heat pipe over time. More specifically, FIG. 5 provides a graph of exemplary heat pipe temperature measurements (expressed in Celsius, ° C.) obtained over time (expressed in seconds) during step 410 of characterization method 400. According to one embodiment, the temperature measurements shown in FIG. 5 may be obtained across the evaporator and condenser sections of a heat pipe. In one example, the temperature measurements shown in FIG. 5 may be temperature differentials of the temperatures (T1 and T2), which are obtained from a first temperature sensor (e.g., temperature sensor 240) coupled to the evaporator section 210 and a second temperature sensor (e.g., temperature sensor 250) coupled to the condenser section 220 of the heat pipe 200 shown in FIG. 2. As noted above, the first temperature sensor (e.g., temperature sensor 240) is coupled to the evaporator section 210 in the vicinity of a first heat generating component (e.g., CPU 110). In such an example, the temperature measurements shown in FIG. 5 may be used to characterize the heat pipe in response to the heat generated by the first heat generating component.

As shown in the exemplary graph of FIG. 5, the heat pipe temperature remains relatively stable (e.g., about 38° C.) during a steady state condition 500 up until the time 510 that the second power level is supplied to the heat generating component (e.g., at about 600 seconds). When the second power level is applied, the temperature measurements obtained from the heat pipe begin to increase at a substantially fixed rate (e.g., about 0.33° C./second) until a second temperature is reached at point 520. Above the second temperature, the temperature measurements abruptly increase at a significantly greater rate (e.g., about 0.82° C./second) than the substantially fixed rate.

Referring to both FIGS. 4 and 5, the onset of heat pipe dry-out ($T_{onset}$) is detected in step 420 when the temperature measurements first transition from the steady state temperature (e.g., about 38° C.) to increasing at the substantially fixed rate. The heat pipe dry-out limit ($T_{dry\text{-}out}$) is detected when the temperature measurements transition from increasing at the substantially fixed rate to increasing at the significantly greater rate. In step 430, a temperature difference ($\Delta T_{max}$, e.g., about 41.3° C. in FIG. 5) is determined between the temperature ($L_{onset}$) measured from the heat pipe at the onset of heat pipe dry-out and the temperature ($T_{dry\text{-}out}$) measured from the heat pipe at the heat pipe dry-out limit. In addition to the temperature difference, a time duration ($\Delta t_{max}$, e.g., about 81 seconds in FIG. 5) between the onset heat pipe dry-out and the heat pipe dry-out limit is determined in step 440 from the temperature measurements. The temperature difference ($\Delta T_{max}$) and the time duration ($\Delta t_{max}$) are stored in step 450, so that they can be later used during operation of the information handling device to extend the performance of the heat pipe to the edge of its cooling capacity.

In some embodiments, the characterization method 400 shown in FIG. 4 may be used to characterize the thermal response of a heat pipe that is thermally coupled to, and configured for dissipating heat from, only one heat generating component (e.g., CPU 110). As noted above, characterization method 400 may be performed to obtain at least one temperature difference ($\Delta T_{max}$) and thermal time constant (or time lag, $\Delta t_{max}$) that occurs between the onset of heat pipe dry-out ($L_{onset}$) and a heat pipe dry-out limit ($T_{dry\text{-}out}$) associated with the heat pipe. As described in more detail below, the temperature difference ($\Delta T_{max}$) can be later used as a threshold value against which a monitored heat pipe temperature difference can be compared to predict heat pipe dry-out. In addition, the thermal time constant ($\Delta t_{max}$) can be used to specify the amount of time (e.g., the Turbo Boost time duration) that the second power level (e.g., a second power level, PL2, of about 45 W) can be supplied to the heat generating component without causing heat pipe dry-out.

In other embodiments, the characterization method 400 shown in FIG. 4 may also be used to characterize the thermal response of a heat pipe having a plurality of heat generating components (e.g., CPU 110 and GPU 120) coupled thereto. If more than one heat generating component is thermally coupled to the heat pipe, the method steps shown in FIG. 4 may generally be repeated for each heat generating component. For example, additional temperature measurements may be obtained in step 410 from another temperature sensor (e.g., temperature sensor 260), which is coupled to the evaporator section 210 of a heat pipe 200 in the vicinity of a second heat generating component (e.g., GPU 120) for measuring temperatures (T3) associated with the second heat generating component. Using the additional temperature measurements associated with the second heat generating component, the onset of heat pipe dry-out ($T_{onset}$) and the heat pipe dry-out limit ($T_{dry\text{-}out}$) can be detected in step 420, and an additional temperature difference ($\Delta T_{max}$) and thermal time constant (or time lag, $\Delta t_{max}$) can be determined in steps 430 and 440 to characterize the heat pipe in response to the heat generated by the second heat generating component. The additional temperature difference ($\Delta T_{max}$) and thermal time constant (or time lag, $\Delta t_{max}$) can be stored in step 450, so that they can be later used during operation of the information handling system to extend the performance of the heat pipe to the edge of its cooling capacity.

Figure 6:
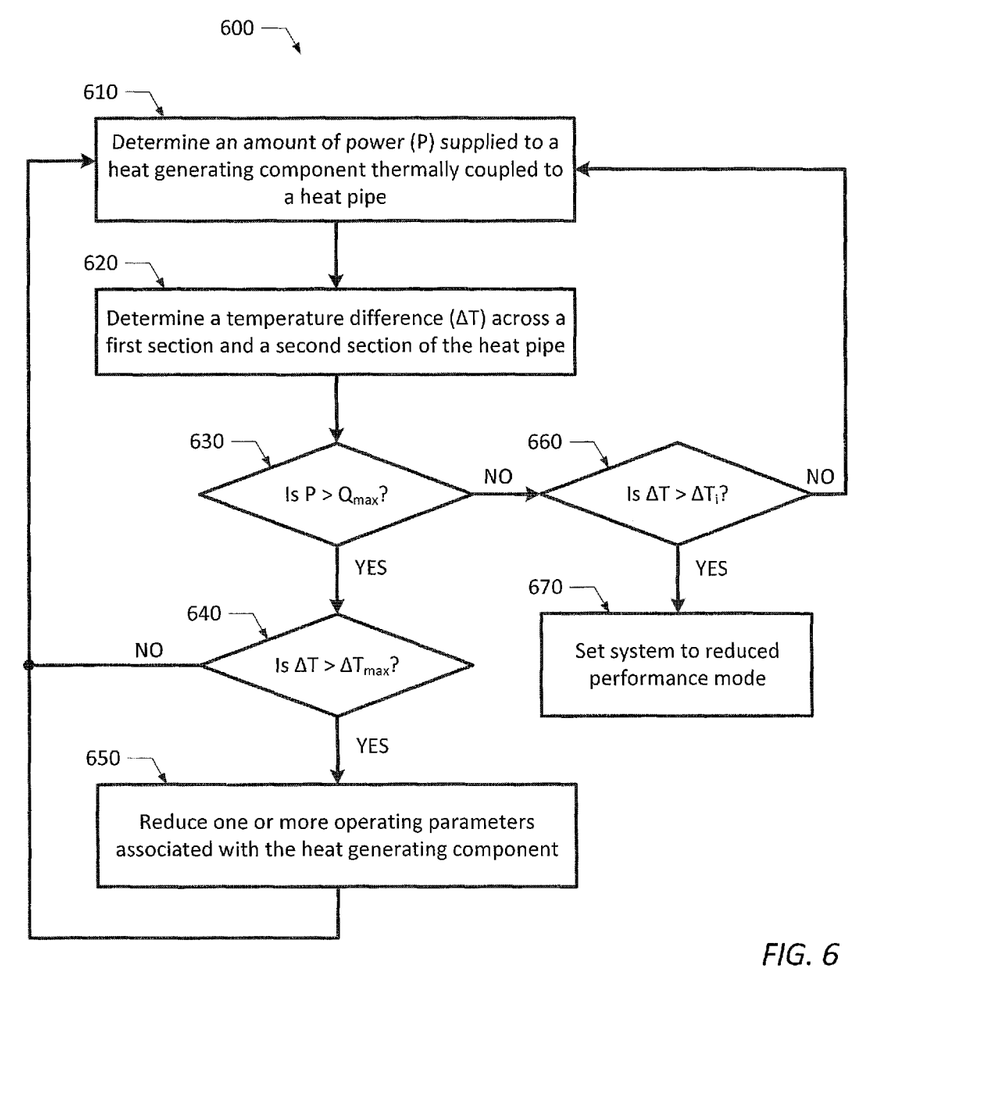
FIG. 6 is a flowchart diagram illustrating one embodiment of a method that may be used to control one or more operating parameters of a heat generating component, which is thermally coupled to a heat pipe.

FIG. 6 is a flowchart diagram illustrating one embodiment of a method 600 that may be used to control one or more operating parameters of at least one heat generating component, which is thermally coupled to a heat pipe. According to one embodiment, the control method 600 shown in FIG. 6 may be performed by a controller of an information handling system such as, but not limited to, the embedded controller (EC) 180 shown in FIGS. 1 and 2. In such embodiments, the controller may perform the method steps shown in FIG. 6 by executing program instructions (or "firmware"), which may be stored within the controller or within a storage medium accessible to the controller. However, the control method 600 shown in FIG. 6 is not strictly limited to a firmware implementation. In other embodiments, one or more steps of method 600 may be performed by circuitry. For example, a comparator may be used in step 640 to compare a voltage output from the temperature sensor(s) to a reference voltage corresponding to $\Delta T_{max}$.

According to one embodiment, control method 600 may determine the amount of power (P) supplied to a heat generating component (e.g., CPU 110 of FIG. 2) thermally coupled to the heat pipe in step 610. In one example, the amount of power (P) may be obtained directly from the heat generating component (e.g., CPU 110 may include a calculator that determines energy/time=power). In step 620, the control method may determine a temperature difference ($\Delta T$) across a first section and a second section of the heat pipe. In the exemplary embodiment shown in FIG. 2, for example, a temperature difference ($\Delta T=T1-T2$) may be determined across the evaporator 210 and condenser 220 sections of heat pipe 200 using the temperature measurements received from temperature sensors 240 and 250. Although steps 610 and 620 are illustrated in FIG. 6 as occurring in a specific order, they are not limited to such. In other embodiments, the order of steps 610 and 620 may be reversed, or steps 610 and 620 may be performed concurrently, without departing from the scope of the present disclosure.

If the amount of power (P) determined in step 610 is greater than the maximum heat transportation limitation, $Q_{max}$, of the heat pipe in step 630 (YES branch of step 630), the control method may compare the temperature difference ($\Delta T$) determined in step 620 to a threshold value indicative of heat pipe dry-out in step 640. According to one embodiment, the threshold value indicative of heat pipe dry-out is the temperature difference ($\Delta T_{max}$), which was previously determined in step 430 and stored in step 450 of the characterization method 400 shown in FIG. 4. If the temperature difference ($\Delta T$) is less than or equal to the threshold value ($\Delta T_{max}$) indicative of heat pipe dry-out (NO branch of step 640), the control method 600 may continue to monitor the amount of power supplied to the heat generating component in step 610 and the heat pipe temperature difference in step 620. If the temperature difference ($\Delta T$) is greater than the threshold value ($\Delta T_{max}$) indicative of heat pipe dry-out (YES branch of step 640), one or more operating parameters associated with the heat generating component may be reduced by a fixed amount in step 650.

The operating parameter(s) associated with the heat generating component may include, but are not limited to, a voltage, a current, a power, a frequency, a duty cycle, a time duration, etc. In one embodiment, the amount of power supplied to the heat generating component may be reduced by a fixed amount in step 650. In one example, the second power level (e.g., a PL2 of 45 W) specified for the heat generating component may be reduced in step 650 by a fixed amount of 5 W; however, any other fixed amount may alternatively be used. In another embodiment, the amount of time that the second power level is supplied to the heat generating component (e.g., the Turbo Boost time duration or thermal time constant, $\Delta t_{max}$) may be reduced by a fixed amount in step 650. In one example, the amount of time ($\Delta t_{max}$) may be reduced by a fixed amount of 1 second in step 650; however, any other fixed amount of time may alternatively be used. In some embodiments, other operating parameters, such as processing speed/frequency, may be additionally or alternatively reduced in step 650 by a fixed amount.

In some embodiments, one or more of the method steps shown in FIG. 6 may be repeated one or more times. For example, if the amount of power (P) supplied to the heat generating component remains above the maximum heat transportation limitation, $Q_{max}$, of the heat pipe after it is reduced in step 650, control method 600 may repeat the steps of determining the amount of power supplied to the heat generating component (step 610), determining a temperature difference (step 620), and reducing one or more operating parameters associated with the heat generating component by a fixed amount (step 650) until the temperature difference ($\Delta T$) determined in step 620 is less than or equal to the threshold value ($\Delta T_{max}$) in step 640 (NO branch of step 640).

If the amount of power (P) determined in step 610 drops below the maximum heat transportation limitation, $Q_{max}$, of the heat pipe in step 630 (NO branch of step 630), the control method may perform one or more additional steps to determine the possibility of heat pipe failure. For example, control method 600 may compare the temperature difference ($\Delta T$) determined in step 620 to one or more additional threshold values in step 660. If the temperature difference ($\Delta T$) is less than $\Delta T_{max}$, but greater than or equal to a first temperature threshold value ($\Delta T_i$) (YES branch of 660), the control method may set the information handling system in a reduced performance mode in step 670. Otherwise (NO branch of 660), the control method may continue to monitor the amount of power supplied to the heat generating component in step 610 and the heat pipe temperature in step 620.

In some embodiments, the information handling system may be set in a reduced performance mode in step 670 by reducing the first power level limit (PL1) and the second power level limit (PL2) of the heat generating component by a predetermined amount. In one example, the first and second power level limits may each be reduced by a predetermined amount of 5 W; however, any other predetermined amount may alternatively be used. In other embodiments, the information handling system may be set in a reduced performance mode in step 670 by reducing the thermal time constant, $\Delta t_{max}$, by a predetermined amount (e.g., by 1 second), or by placing the heat generating component in a lower operational or idle state. If the heat generating device is a processing device (e.g., CPU 110 and GPU 120 of FIG. 2), for example, the information handling system may be set in a reduced performance mode in step 670 by reducing the P-state, C-state or T-state of the processing device or one or more cores of the processing device. P-states are operational states in which voltage-frequency pairs are changed to adjust the speed and power consumption of the processing device, C-states include various idle power saving states for the processing device (PC-states) and the processing cores (CC-states), and T-states are states which toggle between operational and idle states to reduce power consumption without changing the voltage or frequency utilized by the processing device.

In some embodiments, step 660 may compare the temperature difference ($\Delta T$) to a plurality of temperature threshold values ($\Delta T_i$, where i=1 . . . n), where each temperature threshold value corresponds to a different power level. In one example, the temperature difference ($\Delta T$) may be compared to a plurality of temperature threshold values ($\Delta T_i$) including, but not limited to, 5° C., 7° C., and 9° C. In such an example, the information handling system may be set in a reduced performance mode in step 670 if, for example, the amount of power (P) supplied to the heat generating component is 15 W and the temperature difference ($\Delta T$) is 5° C., the amount of power (P) supplied to the heat generating component is 20 W and the temperature difference ($\Delta T$) is 7° C., or the amount of power (P) supplied to the heat generating component is 25 W and the temperature difference ($\Delta T$) is 9° C.

As noted above, the control method 600 shown in FIG. 6 may be used to control one or more operating parameters of a heat generating component (e.g., CPU 110 of FIG. 2) thermally coupled to a heat pipe (e.g., heat pipe 200 of FIG. 2) based on a monitored temperature difference measured across the heat pipe. If more than one heat generating component is thermally coupled to the heat pipe (e.g., CPU 110 and GPU 120 of FIG. 2), step 610 may determine the combined amount of power supplied to all heat generating components thermally coupled to the heat pipe. In step 620, a first temperature difference may be determined across the first and second sections of heat pipe, as noted above, and a second temperature difference may be determined across a third section of the heat pipe and the second section of the heat pipe. In the exemplary embodiment shown in FIG. 2, the first temperature difference ($\Delta T=T1-T2$) is determined across the evaporator 210 and condenser 220 sections of heat pipe 200 using the temperature measurements received from temperature sensors 240 and 250. A second temperature difference ($\Delta T=T3-T2$) is determined across the evaporator 210 and condenser 220 sections of the heat pipe using the temperature measurements received from temperature sensors 260 and 250.

If the combined amount of power is greater than or equal to the maximum heat transportation limitation, $Q_{max}$, of the heat pipe in step 630 (YES branch of step 630), the first temperature difference ($\Delta T1=T1-T2$) and the second temperature difference ($\Delta T2=T3-T2$) may each be compared to a corresponding threshold value indicative of heat pipe dry-out ($\Delta T_{max}$) in step 640. In some embodiments, the corresponding threshold values indicative of heat pipe dry-out may be the temperature differences ($\Delta T_{max}$), which were individually determined in step 430 and stored in step 450 of the characterization method 400 shown in FIG. 4. If the temperature difference ($\Delta T1$ or $\Delta T2$) associated with either heat generating component exceeds the corresponding threshold value ($\Delta T_{max}$), one or more operating parameters associated with that heat generating component may be reduced by a fixed amount in step 650, as described above.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display.

The information handling system may also include one or more buses operable to transmit communications between the various hardware components.

It will be understood that one or more of the tasks, functions, or methodologies described herein may be implemented, for example, as firmware or as a computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for controlling an operating parameter of a heat generating component of an information handling system, wherein the heat generating component is thermally coupled to a heat pipe, the method comprising using at least one processing device of the information handling system to perform the following during operation of the information handling system:
   determine and monitor an amount of power supplied to the heat generating component, wherein the heat generating component comprises a first power level limit and a second power level limit, which is greater than the first power level limit;
   determine and monitor a temperature difference across a first section and a second section of the heat pipe corresponding to the heat generating component; and
   decrease a value of the operating parameter by a fixed amount, if the monitored amount of power is greater than a maximum heat transportation limitation of the heat pipe and the temperature difference is greater than a first threshold value indicative of heat pipe dry-out.

2. The method as recited in claim 1, wherein said operating parameter comprises at least one of a voltage, a current, a power, a frequency, a duty cycle, and a duration of time.

3. The method as recited in claim 1, further comprising using the at least one processing device of the information handling system to repeat the following during operation of the information handling system: determine and monitor an amount of power supplied to the heat generating component, determine and monitor a temperature difference, and decrease a value of the operating parameter by the fixed amount until the amount of power is less than or equal to the maximum heat transportation limitation of the heat pipe and/or the temperature difference is less than or equal to the first threshold value.

4. The method as recited in claim 1, further comprising using the at least one processing device of the information handling system to set the information handling system in a reduced performance mode during operation of the information handling system, if the monitored amount of power supplied to the heat generating component is less than or equal to the maximum heat transportation limitation of the heat pipe, but the monitored temperature difference exceeds a second threshold value, which is less than the first threshold value.

5. The method as recited in claim 4, wherein setting the information handling system in a reduced performance mode during operation of the information handling system comprises reducing the first power level limit and the second power level limit each by a predetermined amount.

6. The method as recited in claim 1, further comprising using the at least one processing device of the information handling system to perform the following during operation of the information handling system:
   determine and monitor an amount of power supplied to a second heat generating component thermally coupled to the first section of the heat pipe; and
   determine and monitor a second temperature difference across the first section and the second section of the heat pipe corresponding to the second heat generating component.

7. The method as recited in claim 6, further comprising using the at least one processing device of the information handling system to perform the following during operation of the information handling system:
   determine and monitor a combined amount of power supplied to the heat generating component and the second heat generating component;
   reduce the amount of power supplied to the heat generating component by the fixed amount, if the combined amount of power is greater than the maximum heat transportation limitation of the heat pipe and the temperature difference exceeds the first threshold value indicative of heat pipe dry-out; and
   reduce the amount of power supplied to the second heat generating component by the fixed amount, if the combined amount of power is greater than the maximum heat transportation limitation of the heat pipe and the second temperature difference exceeds the first threshold value indicative of heat pipe dry-out.

8. The method as recited in claim 1, wherein the at least one processing device comprises an embedded controller of the information handling system and a central processing unit (CPU) or graphics processor unit (GPU) of the information handling system; where the heat generating component of the information handling system comprises the CPU or GPU; where the CPU or GPU is coupled in communication with the embedded controller; and where the method further comprises:
  using the CPU or GPU to determine the amount of power supplied to the CPU or GPU;
  communicating the determined amount of power supplied to the CPU or GPU from the CPU or GPU to the embedded controller;
  using the embedded controller to receive temperature measurements from temperature sensors to determine the monitored temperature difference across the first section and the second section of the heat pipe; and
  using the embedded controller to communicate with the CPU or GPU to set the CPU or GPU in a reduced performance mode to decrease the value of the operating parameter by the fixed amount, if the monitored amount of power is greater than a maximum heat transportation limitation of the heat pipe and the temperature difference is greater than the first threshold value indicative of heat pipe dry-out.

9. The method as recited in claim 1, where the heat-generating component comprises a processing device; where the operating parameter comprises processing speed; and where the method further comprises reducing the processing speed of the processing device by a fixed amount if the monitored amount of power is greater than a maximum heat transportation limitation of the heat pipe and the temperature difference is greater than a first threshold value indicative of heat pipe dry-out.

10. An apparatus for controlling an operating parameter of a heat generating component of an information handling system, wherein the heat generating component comprises a first power level limit and a second power level limit, which is greater than the first power level limit, and wherein the heat generating component is thermally coupled to a heat pipe, the apparatus comprising:
  a first temperature sensor coupled to a first section of the heat pipe;
  a second temperature sensor coupled to a second section of the heat pipe; and
  at least one processing device coupled to the first temperature sensor, the second temperature sensor and the heat generating component, wherein the at least one processing device is programmed to perform the following during operation of the information handling system:
    determine and monitor an amount of power supplied to the heat generating component,
    determine and monitor a temperature difference across the first and second sections of the heat pipe, and
    decrease a value of the operating parameter by a fixed amount, if the monitored amount of power is greater than a maximum heat transportation limitation of the heat pipe and the temperature difference is greater than a first threshold value indicative of heat pipe dry-out.

11. The apparatus as recited in claim 10, wherein said operating parameter comprises at least one of a voltage, a current, a power, a frequency, a duty cycle, and a duration of time.

12. The apparatus as recited in claim 10, wherein the at least one processing device is further programmed to repeatedly perform the following during operation of the information handling system: determine and monitor an amount of power supplied to the heat generating component, determine and monitor a temperature difference, and decrease a value of the operating parameter by a fixed amount until the monitored amount of power is less than or equal to the maximum heat transportation limitation of the heat pipe and/or the monitored temperature difference is less than or equal to the first threshold value.

13. The apparatus as recited in claim 10, wherein the at least one processing device is further programmed to set the information handling system in a reduced performance mode during operation of the information handling system, if the monitored amount of power supplied to the heat generating component is less than or equal to the maximum heat transportation limitation of the heat pipe, but the monitored temperature difference exceeds a second threshold value, which is less than the first threshold value.

14. The apparatus as recited in claim 13, wherein the at least one processing device is further programmed to set the information handling system in the reduced performance mode by reducing the first power level limit and the second power level limit each by a predetermined amount.

15. The apparatus as recited in claim 10, wherein the at least one processing device is further programmed to:
  determine and monitor an amount of power supplied to a second heat generating component thermally coupled to the first section of the heat pipe; and
  determine and monitor a second temperature difference across the first section and the second section of the heat pipe corresponding to the second heat generating component.

16. The apparatus as recited in claim 15, wherein the at least one processing device is further programmed to perform the following during operation of the information handling system:
  determine and monitor a combined amount of power supplied to the heat generating component and to the second heat generating component;
  reduce the amount of power supplied to the heat generating component by the fixed amount, if the combined amount of power is greater than the maximum heat transportation limitation of the heat pipe and the temperature difference exceeds the first threshold value indicative of heat pipe dry-out; and
  reduce the amount of power supplied to the second heat generating component by the fixed amount, if the combined amount of power is greater than the maximum heat transportation limitation of the heat pipe and the second temperature difference exceeds the first threshold value indicative of heat pipe dry-out.

17. The apparatus as recited in claim 10, wherein the at least one processing device comprises an embedded controller of the information handling system and a central processing unit (CPU) or graphics processor unit (GPU) of the information handling system, the embedded controller being coupled in communication with the CPU or GPU; where the heat generating component of the information handling system comprises the CPU or GPU; where the embedded controller is coupled to receive temperature measurements from temperature sensors and is programmed to determine the temperature difference across the first and second sections of the heat pipe; and where the embedded controller is programmed to communicate with the CPU or GPU to set the CPU or GPU in a reduced performance mode to decrease the value of the operating parameter by the fixed amount, if the monitored amount of power is greater than a maximum heat transportation limitation of the heat pipe and the temperature difference is greater than the first threshold value indicative of heat pipe dry-out.

18. The apparatus as recited in claim 10, where the heat-generating component comprises a processing device; where the operating parameter comprises processing speed; and wherein the at least one processing device is programmed to reduce the processing speed of the processing device by a fixed amount during operation of the information handling system if the monitored amount of power is greater than a maximum heat transportation limitation of the heat pipe and the temperature difference is greater than a first threshold value indicative of heat pipe dry-out.

* * * * *